US012610927B2

(12) United States Patent　　　　(10) Patent No.:　US 12,610,927 B2

Kokuga　　　　　　　　　　　　　　　(45) Date of Patent:　　Apr. 28, 2026

---

(54) LURE WITH LATERAL AND FRONT-REAR GUIDING MOVEMENT

(71) Applicant: Shimano Inc., Osaka (JP)

(72) Inventor: Kimio Kokuga, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 19/022,861

(22) Filed: Jan. 15, 2025

(65) Prior Publication Data

US 2025/0261622 A1　Aug. 21, 2025

(30) Foreign Application Priority Data

Feb. 15, 2024　(JP) ................................. 2024-021231

(51) Int. Cl.
　　*A01K 85/18*　　　　(2006.01)
　　*A01K 85/00*　　　　(2006.01)
(52) U.S. Cl.
　　CPC .......... *A01K 85/18* (2013.01); *A01K 85/1807* (2022.02)
(58) Field of Classification Search
　　CPC ............... A01K 85/18; A01K 85/1881; A01K 85/1883; A01K 85/16; A01K 85/1807; A01K 85/1841; A01K 85/1863
　　USPC ................................... 43/42.24, 42.28, 42.15
　　See application file for complete search history.

(56) References Cited

U.S. PATENT DOCUMENTS

| | | | | |
|---|---|---|---|---|
| 1,477,756 A | * | 12/1923 | Heddon ................. | A01K 85/18 43/42.34 |
| 1,692,935 A | * | 11/1928 | Heddon ................. | A01K 85/18 43/42.15 |

---

| | | | | |
|---|---|---|---|---|
| 1,786,568 A | * | 12/1930 | Kutz ...................... | A01K 85/18 43/42.34 |
| 1,791,316 A | * | 2/1931 | Jordan ................... | A01K 85/18 43/42.15 |
| 2,416,834 A | * | 3/1947 | Kuslich .................. | A01K 85/18 43/42.34 |
| 2,503,529 A | * | 4/1950 | Wardrip ................. | A01K 85/18 43/42.15 |
| 2,556,533 A | * | 6/1951 | Graaten ................. | A01K 85/18 43/42.22 |
| 2,597,792 A | * | 5/1952 | Hardy ................... | A01K 85/18 43/42.26 |
| 2,685,145 A | * | 8/1954 | Dean ..................... | A01K 85/18 43/42.15 |

(Continued)

FOREIGN PATENT DOCUMENTS

JP　　　　2019-97526 A　　6/2019

*Primary Examiner* — Zoe Tam Tran
(74) *Attorney, Agent, or Firm* — Spender Fane, LLP

(57)　　　　　　　ABSTRACT

A lure includes a front body and a read body. A connecting member connects first and second connecting parts that face each other in the front and rear direction of the front and rear bodies. A holding part is provided in one of the first and second connecting parts. A first swinging shaft is provided in one of the first and second connecting parts, swingably supporting the connecting member, and guides the connecting member between a first position and a second position where the connecting member is held by the holding part. A second swinging shaft is provided in the other of the first and second connecting parts and swingably supporting the connecting member, when the connecting member in the one of the first and second connecting parts is in the first position, the front and rear bodies move in directions away from each other.

6 Claims, 10 Drawing Sheets

(56) References Cited

U.S. PATENT DOCUMENTS

| | | | | |
|---|---|---|---|---|
| 3,172,227 A * | 3/1965 | Mackey | ................. | A01K 85/18 43/42.31 |
| 3,367,059 A * | 2/1968 | Puls | ....................... | A01K 85/18 43/42.31 |
| 3,815,275 A * | 6/1974 | Amundson | ............ | A01K 85/16 43/42.22 |
| 5,406,738 A * | 4/1995 | Holleman, Sr. | ........ | A01K 85/18 43/42.15 |
| 9,433,196 B1 * | 9/2016 | Micelli | .................. | A01K 85/18 |
| 2002/0083636 A1 * | 7/2002 | Thorne | .................. | A01K 85/18 43/42.03 |
| 2002/0170225 A1 * | 11/2002 | Gibbs | ................... | A01K 85/00 43/42.28 |
| 2002/0189150 A1 * | 12/2002 | Thorne | ................. | A01K 85/18 43/42.15 |
| 2005/0102884 A1 * | 5/2005 | Kato | ....................... | A01K 85/18 43/42.15 |
| 2011/0239521 A1 * | 10/2011 | Tsai | ....................... | A01K 85/18 43/42.47 |
| 2013/0185989 A1 * | 7/2013 | Langer | ................. | A01K 85/12 43/42.11 |
| 2016/0360737 A1 * | 12/2016 | Yates | ................... | A01K 85/18 |
| 2019/0246612 A1 * | 8/2019 | Shunk | ................... | A01K 85/18 |
| 2022/0361466 A1 * | 11/2022 | Kokuga | ................. | A01K 85/18 |

* cited by examiner

LURE WITH LATERAL AND FRONT-REAR GUIDING MOVEMENT

CROSS-REFERENCE TO RELATED APPLICATIONS

This application claims priority to Japanese Patent Application No. 2024-021231, filed on Feb. 15, 2024. The entire disclosure of Japanese Patent Application No. 2024-021231 are hereby incorporated by reference.

BACKGROUND

Technical Field

The present invention relates to a lure.

Background Information

Conventionally, joint fishing lures having a body divided into a plurality of segments in the front-rear direction are known. See for example, the fishing lure disclosed in Japanese Laid-Open Patent Application No. 2019-97526.

SUMMARY

In a conventional joint lure such as that described in Japanese Laid-Open Patent Application No. 2019-97526, the swingable angle of the joint is generally set to be within a range of ±90 degrees to achieve the desired swimming action. It has been determined however, that such lures result in a flight attitude that is unstable during flight and it is difficult to achieve a large flight distance. Accordingly, there is room for improvement in this regard.

Embodiments of the present invention were conceived in light of these circumstances, and an object thereof is to provide a lure that has a stable flight attitude and that can increase the flight distance.

A first aspect of a lure according to the present disclosure comprises front and rear bodies divided into a plurality of segments in a front-rear direction, a connecting member that connects a pair of connecting parts that face each other in the front and rear direction of the bodies, a holding part provided in at least one of the pair of connecting parts, a first swinging shaft that is provided in the one connecting part, that swingably supports the connecting member, and that guides the connecting member between a first position and a second position where the connecting member is held by the holding part, and a second swinging shaft that is provided in the other connecting part, and that swingably supports the connecting member, wherein, when the connecting member in the one connecting part is in the first position, the front and rear bodies move in directions away from each other.

According to the first aspect of the lure of the present disclosure, when the lure is caused to swim, the front and rear bodies come close together and the connecting member is maintained in a second position in which the connecting member is held by the holding part provided in the one connecting part, so that the swinging of the bodies relative to each other is restricted, resulting in a swing having a small swingable angle. Therefore, the swingable angle of the rear body relative to the front body is restricted to range that allows swimming actions in the swimming attitude, such as ±90 degrees or less. On the other hand, during flight of the lure, the front and rear bodies move away from each other due to centrifugal force generated by the flight, so that the connecting member moves away from the holding part and moves from the second position to the first position on the first swinging shaft. That is, as a result of the front and rear bodies moving away from each other, the region in which the bodies interfere with each other becomes small, thereby increasing the swingable angle. Therefore, during flight of the lure, the swingable angle can be set greater than ±90 degrees, for example, resulting in a flight attitude in which the tail side of the rear body faces forward. Accordingly, the flight attitude of the lure during flight becomes stable and the flight distance can be increased.

A second aspect of the present disclosure is the lure according to the first aspect, wherein, preferably, when a swingable angle in an attitude in which the front and rear bodies are positioned on a straight line in the front-rear direction is 0 degrees, the swingable angle of the rear body on the rear side relative to the front body on the front side is ±90 degrees or less when in the second position, and the swingable angle exceeds ±90 degrees when in the first position.

In this case, the swingable angle of the second body relative to the first body is ±90 degree or less, so that the desired swimming action can be achieved. In addition, the swingable angle in the flight attitude exceeds ±90 degrees, so that the flight attitude of the lure during flight can be more reliably stabilized and the flight distance can be increased.

A third aspect of the present disclosure is the lure according to the second aspect, wherein at least one of the front and rear bodies includes a restricting portion that restricts the swingable angle between the bodies when in the second position to ±90 degrees or less.

In this case, the restricting portion can restrict the swingable angle of the connecting member when in the second position to ±90 degrees or less.

A fourth aspect of the present disclosure is the lure according to any one of the first to the third aspects, wherein the first swinging shaft can have a swinging shaft portion that supports the connecting member at the first position, and a guide portion that guides the connecting member from the swinging shaft portion in a direction approaching the holding part, and the guide portion can gradually incline forward with proximity to the holding part.

In this case, when centrifugal force is not acting on the lure, the connecting member is held by the holding part and guided by the first swinging shaft to move from the first position to the second position. At this time, the connecting member is guided by the inclined guide portion of the first swinging shaft and moves obliquely forward, so the front and rear bodies move in directions approaching each other. Therefore, when the connecting member is in the second position, swinging of the connecting member about the first swinging shaft is restricted, and the rear body, which swings about the second swinging shaft, approaches the front body, limiting the swing range thereof. Therefore, the swingable angle does not become large and a suitable swimming attitude can be achieved.

A fifth aspect of the present disclosure is the lure according to any one of the first to the fourth aspects, wherein the second swinging shaft can gradually incline rearward as the connecting member moves toward the second position.

In this case, when centrifugal force is not acting on the lure, the connecting member is held by the holding part and guided by the first swinging shaft and the second swinging shaft to move from the first position to the second position. At this time, the connecting member is guided by the inclined second swinging shaft and moves obliquely rearward, so the front and rear bodies move in directions approaching each other. The connecting member moves to the first position during flight when centrifugal force acts on the lure. At this time, the connecting member is guided by the inclined second swinging shaft and moves obliquely forward, so the front and rear bodies move in directions away from each other. That is, the rear body (second swinging shaft side) can also be moved in a direction in which the front and rear bodies move away from each other, increasing the distance between the front and rear bodies, so the swingable angle can be efficiently increased.

A sixth aspect of the present disclosure is the lure according to any one of the first to the fifth aspects, wherein the holding part can be a magnet, and the connecting member can be formed of a magnetic material.

In this case, the connecting member and the holding part (magnet) can be easily attached to/detached from each other with a simple structure using magnetic force.

A seventh aspect of the present invention is the lure according to any one of the first to the sixth aspects, wherein an end surface of at least one of the pair of connecting parts facing the front-rear direction includes a mounting portion to/from which a functional member can be attached/detached.

In this case, when the connecting member is in a swingable position, the swingable angle between the front and rear bodies can be maximized to expose the end surface of the connecting part, thereby making it possible to attach/detach a functional member to/from the mounting portion provided on this end surface.

According to the lure of the present disclosure, it is possible to increase the strength of the connecting parts of the divided bodies, and to prevent the swinging shaft portions of the connecting parts from falling off.

DETAILED DESCRIPTION

An embodiment of a lure according to the present disclosure is described below with reference to the figures. In each of the drawings, there are cases in which the scale of each component has been appropriately changed as required to improve the visibility of the component.

Figure 1:
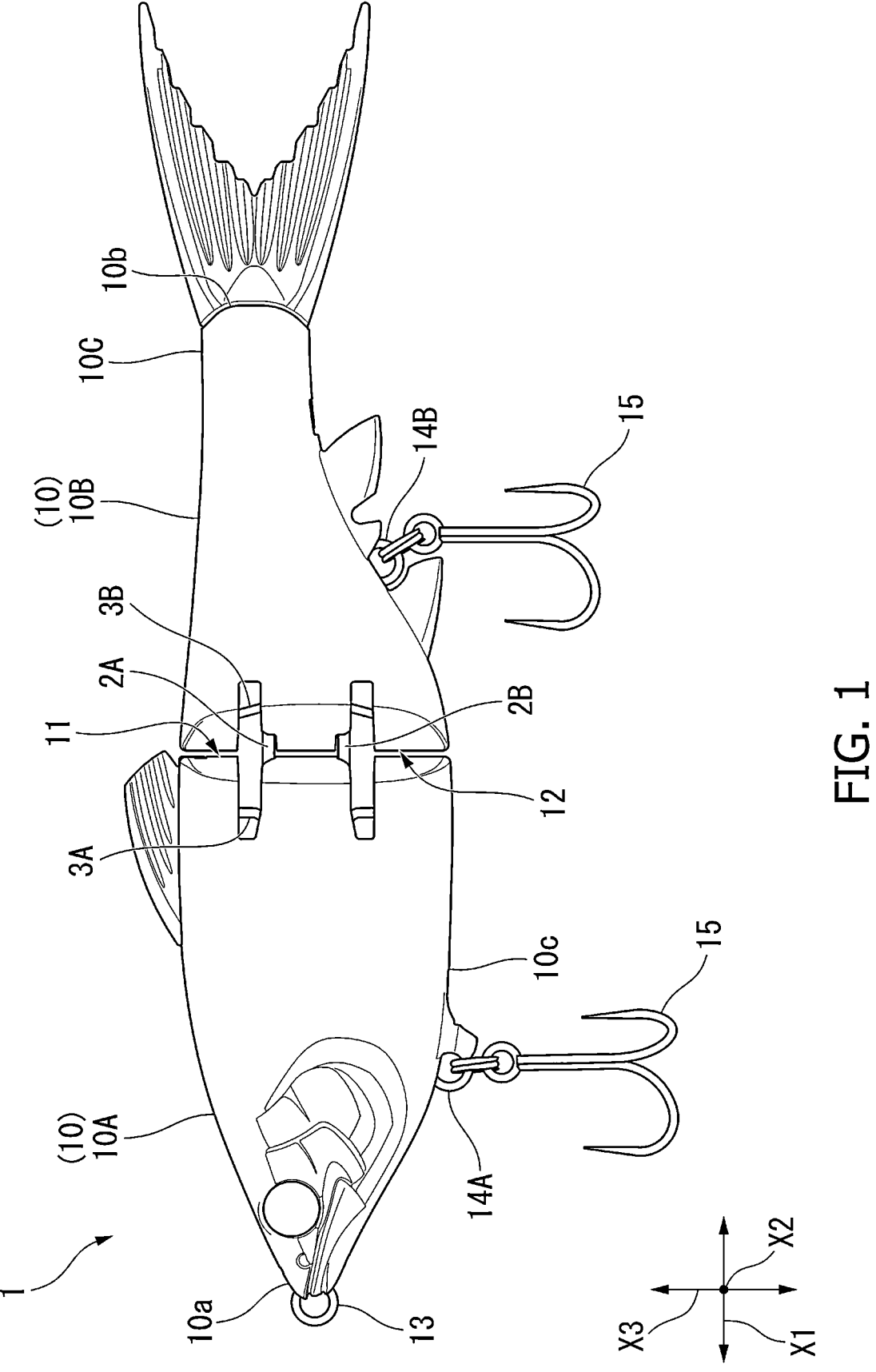
FIG. 1 is a side view of a lure according to an embodiment of the present invention.
Figure 2:
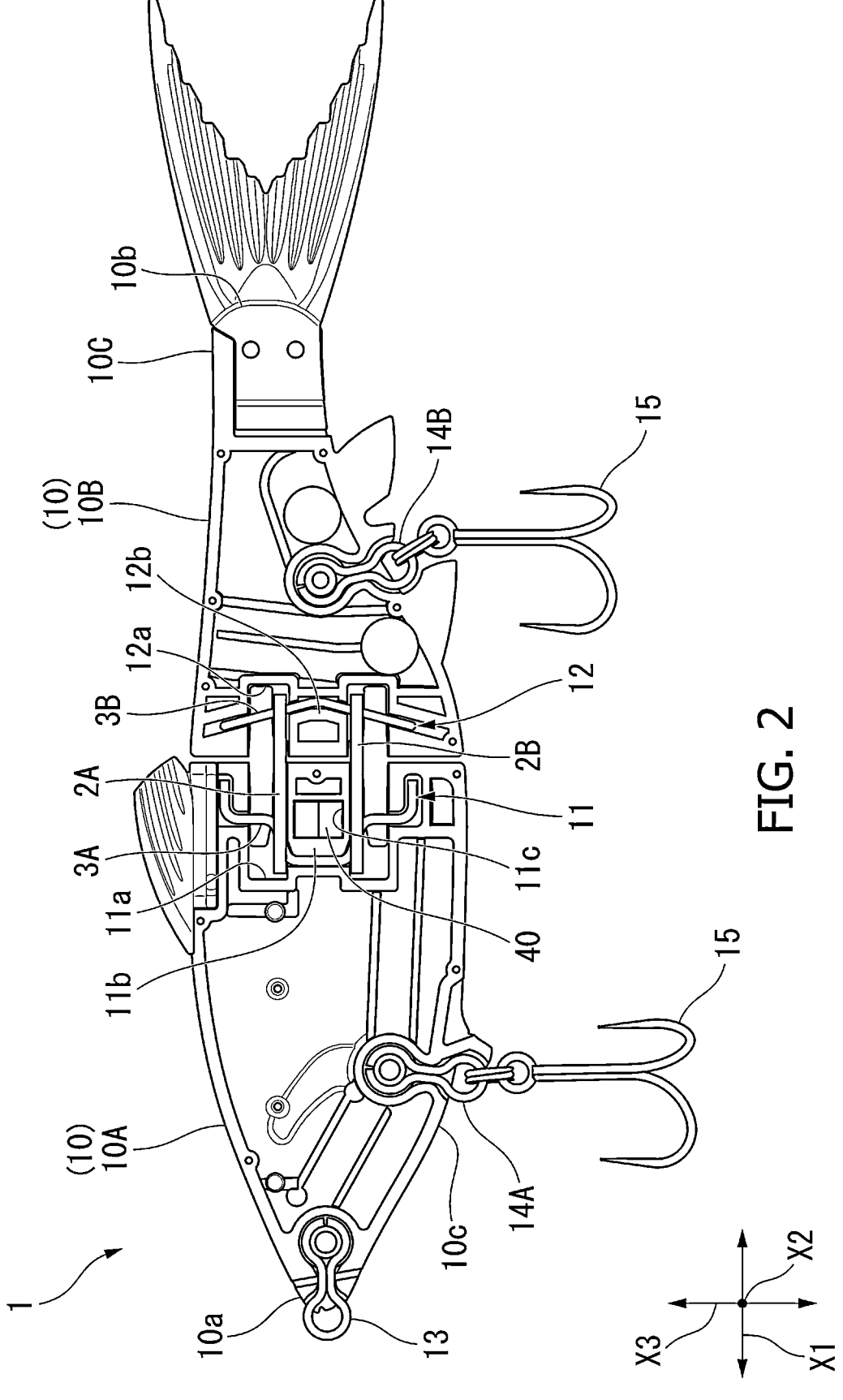
FIG. 2 is a side view showing an internal structure of the lure shown in FIG. 1.

As shown in FIGS. 1 and 2, an example of a lure 1 according to the embodiment is a joint lure that is used for fishing, that has a body made of hard plastic, and that resembles the shape of a small fish.

Here, in the lure 1, the direction in which the head and the tail are connected in a straight line is defined as the front-rear direction X1, the head side is defined as the front/front side, and the tail side is defined as the rear/rear side. Further, as seen from above, the lateral direction orthogonal to the front-rear direction X1 is defined as the left-right direction X2, and the up-down direction of the lure 1 when in the swimming attitude is defined as the up-down direction X3 in the following descriptions.

The lure 1 is formed in a streamlined shape that simulates a fish, and is integrally formed by joining peripheral portions of a pair of halves of a body 10 to each other by bonding, welding, or the like. The body 10 is segmented into two parts in the front-rear direction X1 into a head body 10A (first body) disposed on the front side, and a trunk body 10B (second body) disposed on the rear side and that has a tail portion 10C, which are provided so as to be able to swing freely in the left-right direction X2. Each of the bodies 10A and 10B has a hollow portion formed therein.

The lure 1 has a shape in which the cross section becomes largest at a central portion (at the connecting portion between the head body 10A and the trunk body 10B) in the front-rear direction X1. That is, the lure 1 becomes thicker from a front-end portion 10a to the central portion and becomes thinner from the central portion to a rear-end portion 10b, forming a smooth curve overall.

The head body 10A is provided on the head side and is formed in a shape imitating roughly the front half of a fish. A line eye 13 is provided on the front-end portion 10a of the head body 10A. A first hook eye 14A, to which is connected a hook 15 for hooking fish, is provided on a lower surface 10c of the head body 10A.

Figure 3:
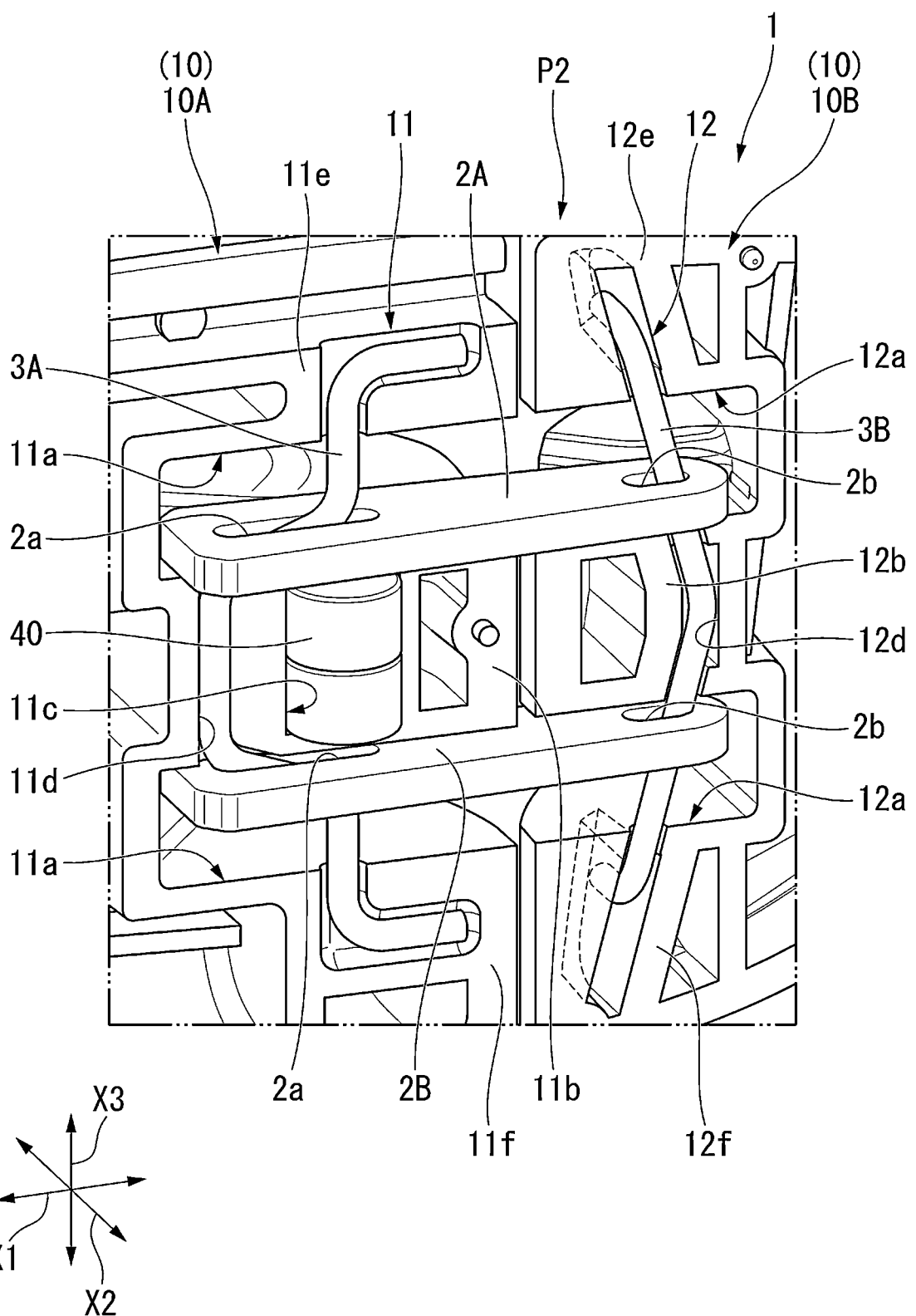
FIG. 3 is a perspective view showing main parts of connecting parts of bodies of the lure shown in FIG. 1.
Figure 4:
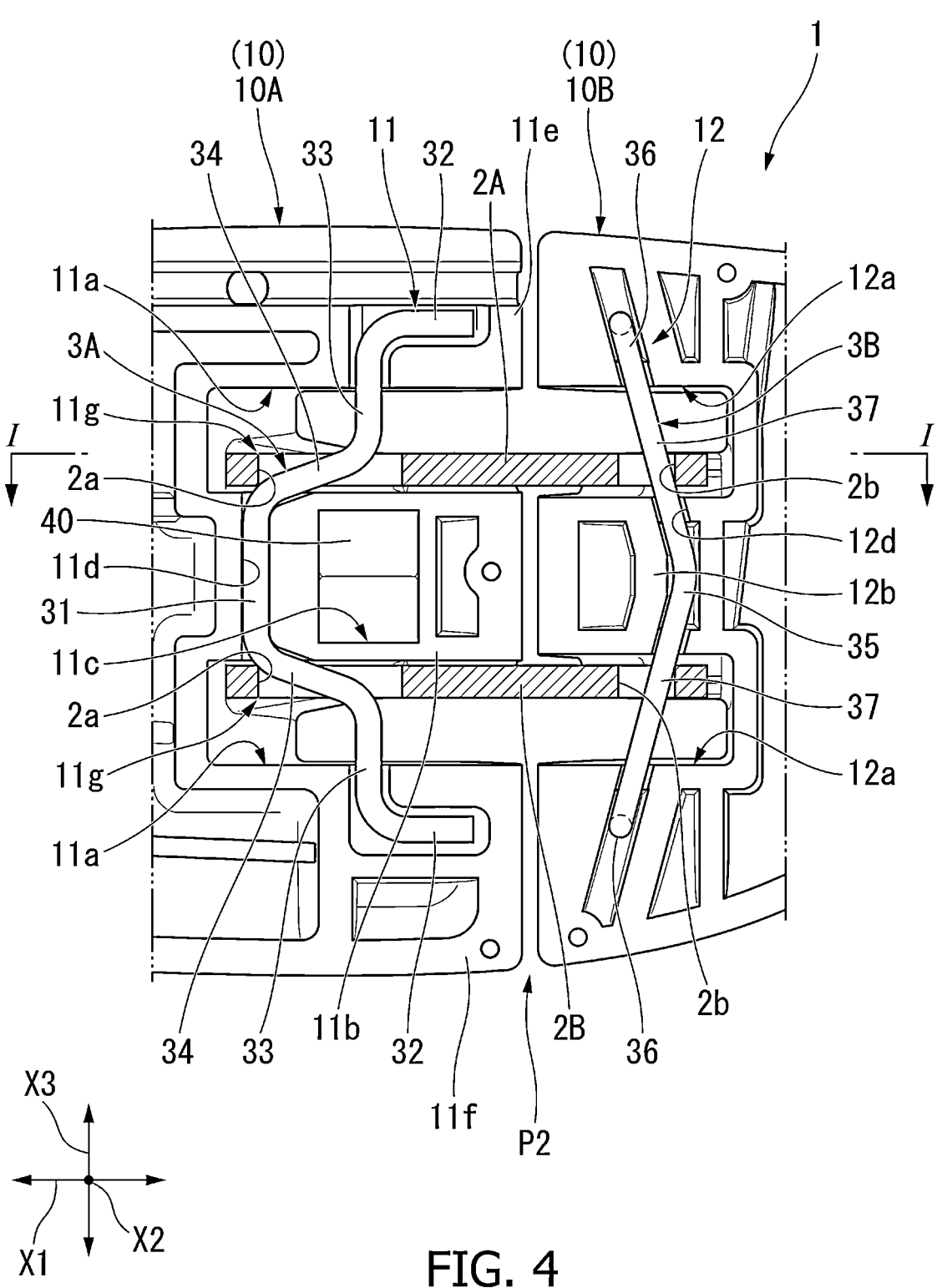
FIG. 4 is a side view of the connecting parts shown in FIG. 3, showing a second position.

The head body 10A is connected to the trunk body 10B via connecting parts 11, 12 so as to be able to swing in the left-right direction X2. The front connecting part 11 is located in the rear portion of the head body 10A. The rear connecting part 12 is located in the front portion of the trunk body 10B. The front connecting part 11 and the rear connecting part 12 face each other in the front-rear direction X1 when the lure 1 is not swinging. As shown in FIGS. 2-4, the head body 10A has a pair of connecting members 2A, 2B that are swingably connected to the trunk body 10B, and swinging shafts 3A, 3B that swingably support the connecting members 2A, 2B.

The pair of connecting members 2A, 2B connect the pair of connecting parts 11, 12 that face each other in the front-rear direction on the respective bodies 10A, 10B. The pair of connecting members 2A, 2B are disposed spaced apart from each other above and below substantially the center of the lure 1 in the up-down direction X3. The pair of connecting members 2A, 2B are respectively provided on the head body 10A and the trunk body 10B in swingable fashion. That is, the connecting members 2A, 2B support the trunk body 10B with respect to the head body 10A so that the trunk body 10B can be swung and folded to the left and right.

In the present embodiment, a pair of the connecting members 2A, 2B are provided in the up-down direction, but the number of the connecting members is not particularly limited. For example, there may be one connecting member, or, three or more connecting members may be arranged in the up-down direction X3.

The connecting members 2A, 2B are elongated, plate-like members that are made of, for example, stainless steel (SUS), which is a magnetic material. Shaft holes 2a, 2b are formed at both longitudinal ends of the connecting members 2A, 2B, penetrating in the thickness direction. The connecting members 2A, 2B are arranged such that the longitudinal directions thereof are oriented in the front-rear direction X1, and with the flat faces thereof perpendicular to the up-down direction X3. That is, the connecting members 2A, 2B are attached to the bodies 10A, 10B in a state in which the axial direction of the shaft holes 2a, 2b coincides with the up-down direction X3. The first shaft hole 2a on the front side is disposed inside the head body 10A, and a first swinging shaft 3A of the head body 10A is inserted therethrough. The second shaft hole 2b on the rear is disposed inside the trunk body 10B, and a second swinging shaft 3B of the trunk body 10B, described further below, is inserted therethrough.

The first shaft hole 2a and the second shaft hole 2b are elongated holes extending along the longitudinal direction of the connecting members 2A, 2B. The first shaft hole 2a on the front side has a longer hole length than the second shaft hole 2b on the rear side.

The front connecting part 11 at the rear portion of the head body 10A includes first recesses 11a that house the respective front portions of the pair of connecting members 2A, 2B. The height of the first recess 11a is greater than the thickness of the connecting members 2A, 2B and is set to be a prescribed dimension that allows the connecting members 2A, 2B to move in the up-down direction X3.

A central wall portion 11b between the pair of upper and lower first recesses 11a provided in the front connecting part 11 includes a holding part 40 made of a magnet that holds each of the pair of upper and lower connecting members 2A, 2B by magnetic force. The central wall portion 11b has a hollow portion 11c. The holding part 40 is engaged with the hollow portion 11c. The wall thickness of the central wall portion 11b on the side of the hollow portion 11c and the first recesses 11a is set to an appropriate thickness that allows the action of magnetic force capable of holding the connecting members 2A, 2B, which are disposed in the first recesses 11a.

Figure 5:
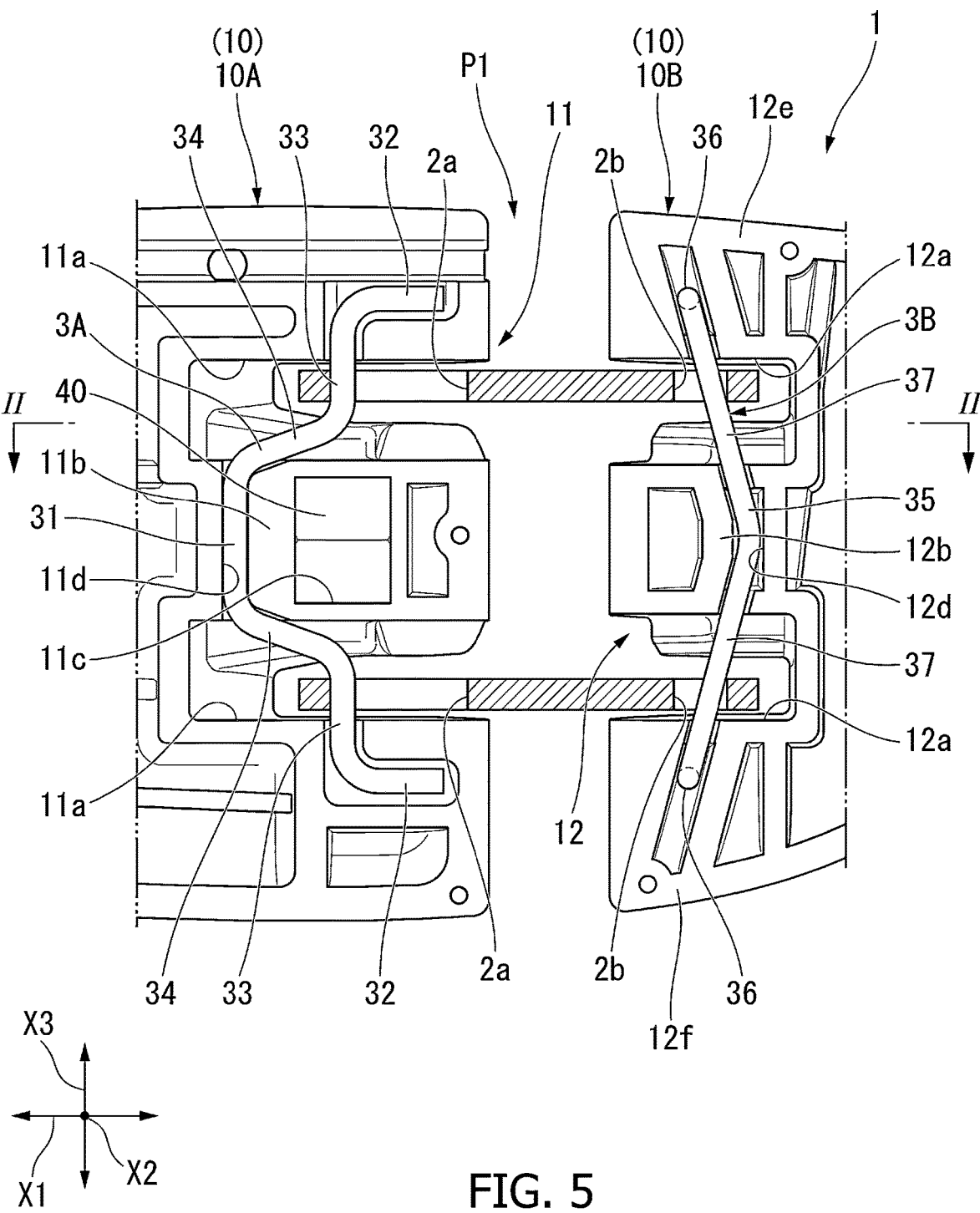
FIG. 5 is a side view showing a first position of the connecting parts shown in FIG. 4.

As shown in FIGS. 3-5, the first swinging shaft 3A is a rod-like member made of metal, and, for example, a high-strength thick wire having an outer diameter of about 2 mm can be employed. The first swinging shaft 3A is provided in the front connecting part 11, and supports the pair of connecting members 2A, 2B in the first shaft holes 2a so as to be able to swing. The first swinging shaft 3A guides the connecting members 2A, 2B between a first position P1 (refer to FIGS. 3 and 5) away from the central wall portion 11b in the up-down direction X3, and a second position P2 (refer to FIG. 4) where the connecting members 2A, 2B are held by the holding part 40.

Figure 9:
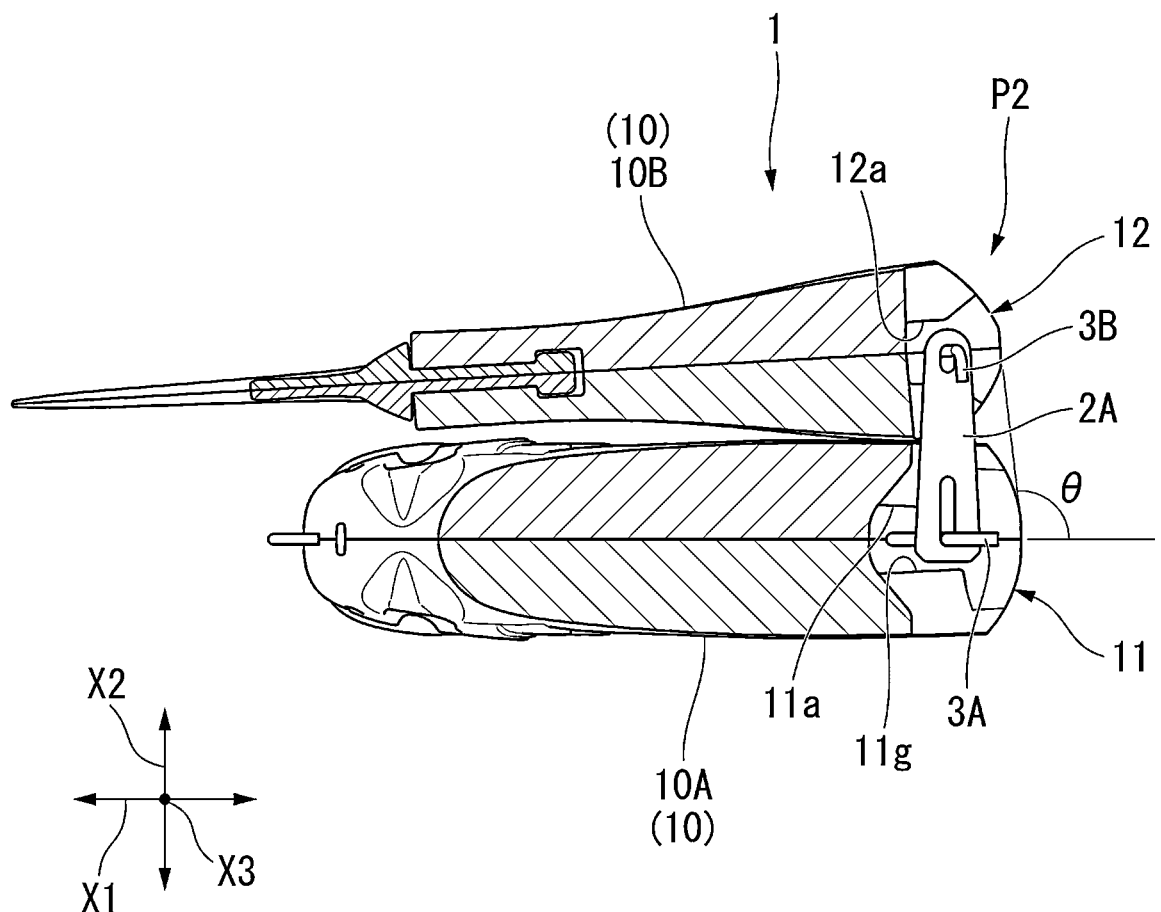
FIG. 9 is a horizontal cross-sectional view showing the swinging state when in the first position.

Here, in the lure 1, the first position P1 is an attitude in which swinging is possible such that the swingable angle θ between the head body 10A and the trunk body 10B is greater than ±90 degrees (refer to FIG. 9), and the second position P2 is an attitude in which the swingable angle between the head body 10A and the trunk body 10B is ±90 degrees or less.

In addition, the central wall portion 11b includes a first locking hole 11d that locks a support shaft portion 31 at the central portion of the first swinging shaft 3A in a state in which the support shaft portion 31 is inserted in the up-down direction X3. The portions of the first swinging shaft 3A above and below the support shaft portion 31 are respectively located in the first recesses 11a in which the connecting members 2A, 2B are disposed.

The first swinging shaft 3A has the support shaft portion 31 located at the center in the up-down direction X3, locking portions 32 that are locked to an upper wall portion 11e and a lower wall portion 11f of the front connecting part 11 of the head body 10A, swinging shaft portions 33 that support the pair of connecting members 2A, 2B when in the first position P1, and guide portions 34 that guide the connecting members 2A, 2B from the swinging shaft portions 33 toward the holding part 40.

The swinging shaft portions 33 and the guide portions 34 are located in the first recesses 11a. The swinging shaft portions 33 extend in the up-down direction X3. The guide portions 34 are connected between the swinging shaft portions 33 and the support shaft portion 31 and gradually incline forward with proximity to the holding part 40. The connecting members 2A, 2B are provided so as to be able to slide along the swinging shaft portions 33 and the guide portions 34, as well as to be able to swing. The connecting members 2A, 2B can move in the first recesses 11a in the front-rear direction X1. That is, the connecting members 2A, 2B are positioned forward and in contact with the central wall portion 11b when in the second position P2 held by the holding part 40, and are positioned rearward and away from the central wall portion 11b when in the first position P1. When being subjected to a force that pulls in the rearward direction, the connecting members 2A, 2B gradually move in directions away from the central wall portion 11b while moving rearward in the first recesses 11a.

The trunk body 10B is connected to the head body 10A via the connecting parts 11, 12 so as to be able to swing in the left-right direction X2. The rear connecting part 12 at the front portion of the trunk body 10B includes second recesses 12a that house the respective rear portions of the pair of connecting members 2A, 2B. The height of the second recesses 12a is greater than the thickness of the connecting members 2A, 2B and is set to be a prescribed dimension that allows the connecting members 2A, 2B to move in the up-down direction X3. The rear connecting part 12 has a central wall portion 12b between the pair of upper and lower second recesses 12a.

The second swinging shaft 3B is a rod-like member made of metal, and, for example, a high-strength thick wire having an outer diameter of about 2 mm can be employed. The second swinging shaft 3B is provided in the rear connecting part 12, and supports the pair of connecting members 2A, 2B in the second shaft holes 2b so as to be able to swing. The second swinging shaft 3B guides the connecting members 2A, 2B between a position (same position as the first position P1) away from the central wall portion 12b in the up-down direction X3, and a position (same position as the second position P2) close to the central wall portion 12b.

In addition, the central wall portion 12b includes a second locking hole 12d that locks a support shaft portion 35 at the central portion of the second swinging shaft 3B in a state in which the support shaft portion 35 is inserted in the up-down direction X3. The portions of the second swinging shaft 3B above and below the support shaft portion 35 are respectively located in the second recesses 12a in which the connecting members 2A, 2B are disposed.

The second swinging shaft 3B has the support shaft portion 35 located at the center in the up-down direction X3, locking portions 36 that are locked to an upper wall portion 12e and a lower wall portion 12f of the rear connecting part 12 of the trunk body 10B, and swinging shaft portions 37 that support the pair of connecting members 2A, 2B in the first position P1 and the second position P2.

The swinging shaft portions 37 are located in the second recesses 12*a*. The swinging shaft portions 37 are connected between the locking portions 36 and the support shaft portion 35 and gradually incline rearward with proximity to the central wall portion 12*b*, which is the second position P2. The connecting members 2A, 2B are provided so as to be able to slide along the swinging shaft portions 3, as well as to be able to swing. The connecting members 2A, 2B can move in the second recesses 12*a* in the front-rear direction X1. That is, the connecting members 2A, 2B are positioned forward and in contact with the central wall portion 12*b* when in the second position P2, and are positioned rearward and away from the central wall portion 12*b* when in the first position P1.

In the lure 1 configured in this manner, the front and rear bodies 10A, 10B move in directions away from each other when the connecting members 2A, 2B in the front connecting part 11 are in the first position P1.

The swing range and the swingable angle θ of the front and rear bodies 10A, 10B of the lure 1 will be described next.

As shown in FIGS. 6-9, in the lure 1, when the swingable angle θ is 0 degrees when the front and rear bodies 10A, 10B are positioned on a straight line in the front-rear direction X1, the swingable angle θ of the second body on the rear side relative to the head body 10A on the front side is ±90 degrees or less when in the second position P2, and the swingable angle θ exceeds ±90 degrees when in the first position P1.

Figure 6:
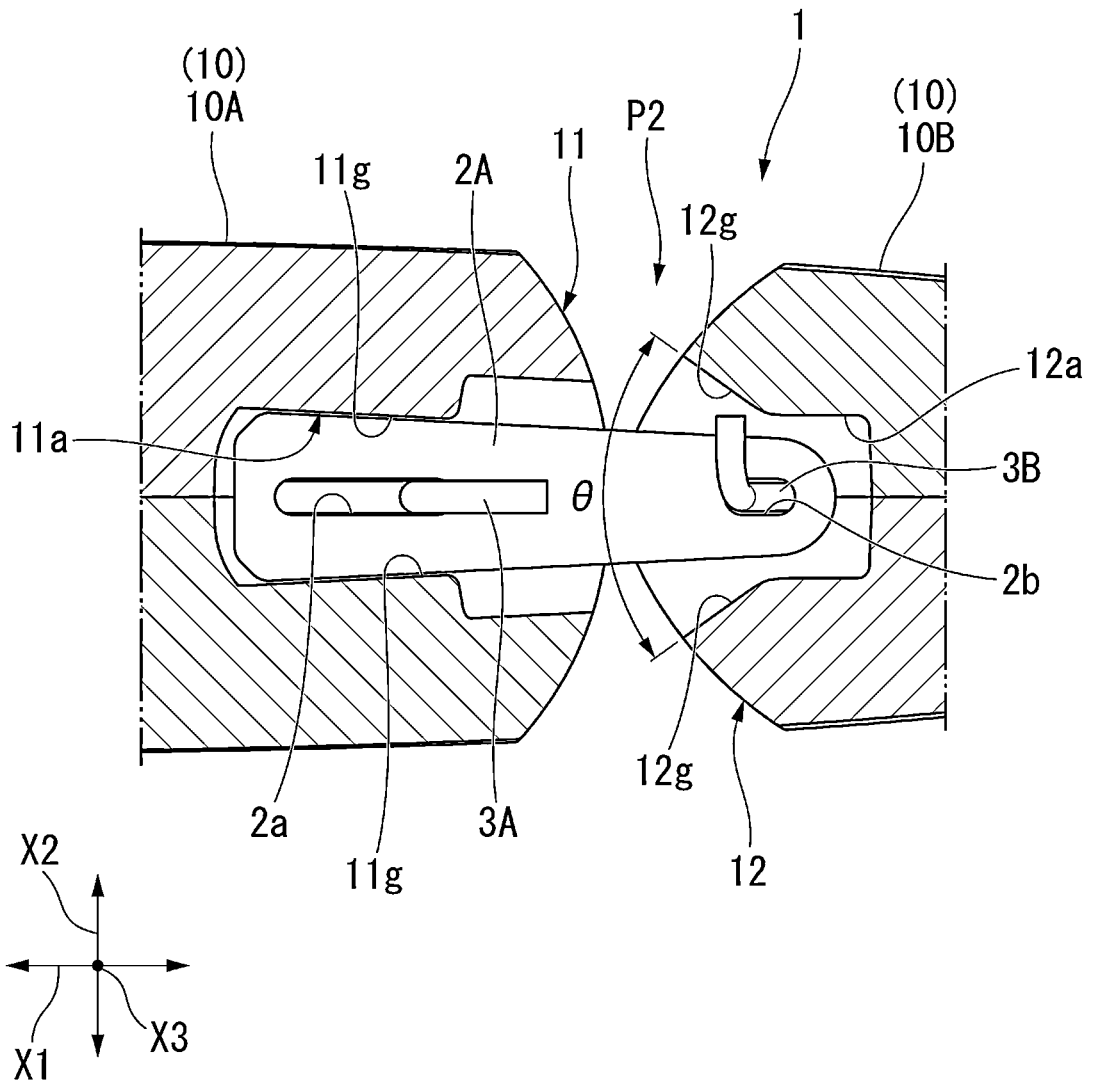
FIG. 6 is a cross-sectional view along line I-I shown in FIG. 4.
Figure 7:
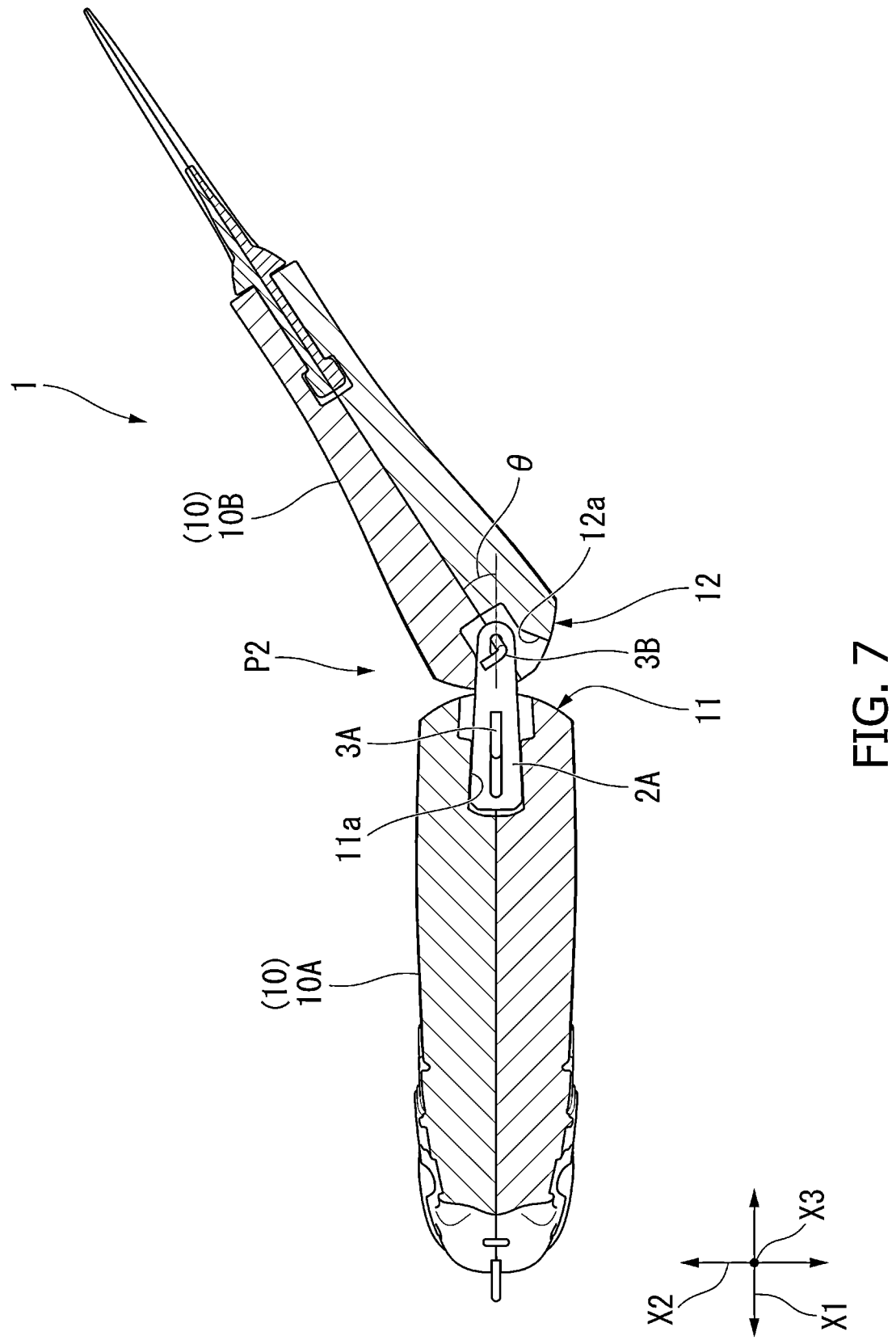
FIG. 7 is a horizontal cross-sectional view showing a swinging state when in the second position.
Figure 8:
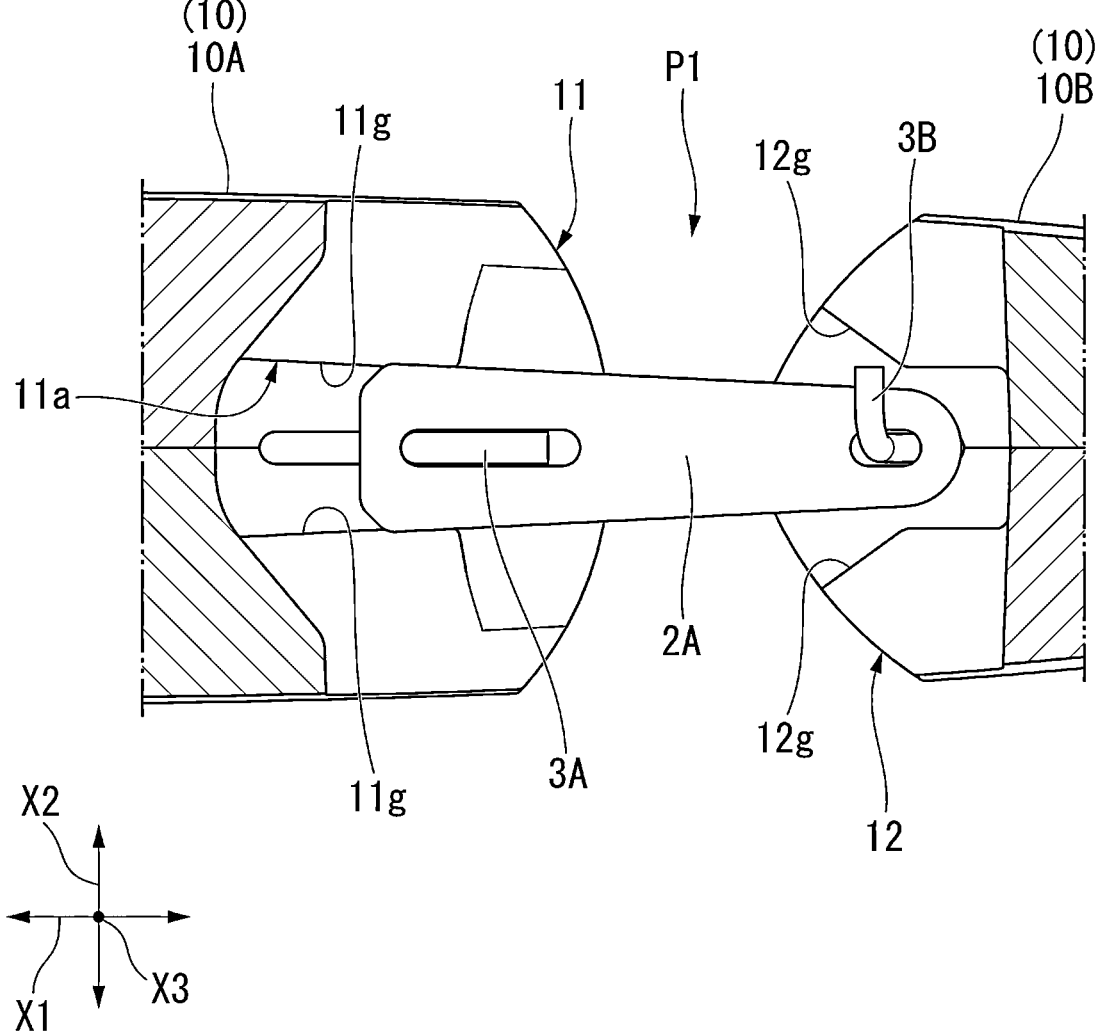
FIG. 8 is a cross-sectional view along line II-II shown in FIG. 5.

As shown in FIGS. 4 and 6, the first recesses 11*a* in the front connecting part 11 have first restricting walls 11*g* (restricting portions) that prevent the connecting members 2A, 2B from swinging relative to the first swinging shaft 3A when in the second position P2. In addition, the second recesses 12*a* in the rear connecting part 12 have second restricting walls 12*g* (restricting portions) that restrict the swinging of the connecting members 2A, 2B relative to the second swinging shaft 3B when in the second position P2.

The first restricting walls 11*g* are disposed in front of the first recesses 11*a* and are positioned on the left and right sides of the connecting members 2A, 2B. The distance between the opposing first restricting walls 11*g* is about the same as the width of the front portions of the connecting members 2A, 2B in the left-right direction X2. In the head body 10A, the connecting members 2A, 2B are prevented from swinging by the first restricting walls 11*g* when in the second position P2 shown in FIG. 6, and become swingable with the restriction by the first restricting walls 11*g* being released when in the first position P1 shown in FIG. 8.

The second restricting walls 12*g* are disposed in front of the second recesses 12*a* and are positioned on the left and right sides of the connecting members 2A, 2B. The left and right pair of second restricting walls 12*g* are inclined such that the distance therebetween increases toward the front. The swingable angle θ of the connecting members 2A, 2B is ±90 degrees or less when in the second position P2 restricted by the pair of second restricting walls 12*g*. In the trunk body 10B, the connecting members 2A, 2B have a swing range that is restricted by the second restricting walls 12*g* when in the second position P2 shown in FIG. 7, and become swingable with a swing range that is larger than when in the second position P2, with the restriction by the second restricting walls 12*g* being released, when in the first position P1 shown in FIG. 9.

As a result of the lure 1 configured in this manner, by providing the first restricting walls 11*g* and the second restricting walls 12*g*, the swingable angle θ between the bodies 10A, 10B is restricted to ±90 degrees or less when in the second position P2, and, when in the first position P1, the front and rear bodies 10A, 10B move in directions away from each other, the restriction on the swinging by the first and second restricting walls 11*g*, 12*g* is released, and the swingable angle θ between the bodies 10A, 10B becomes greater than ±90 degrees.

Figure 10:
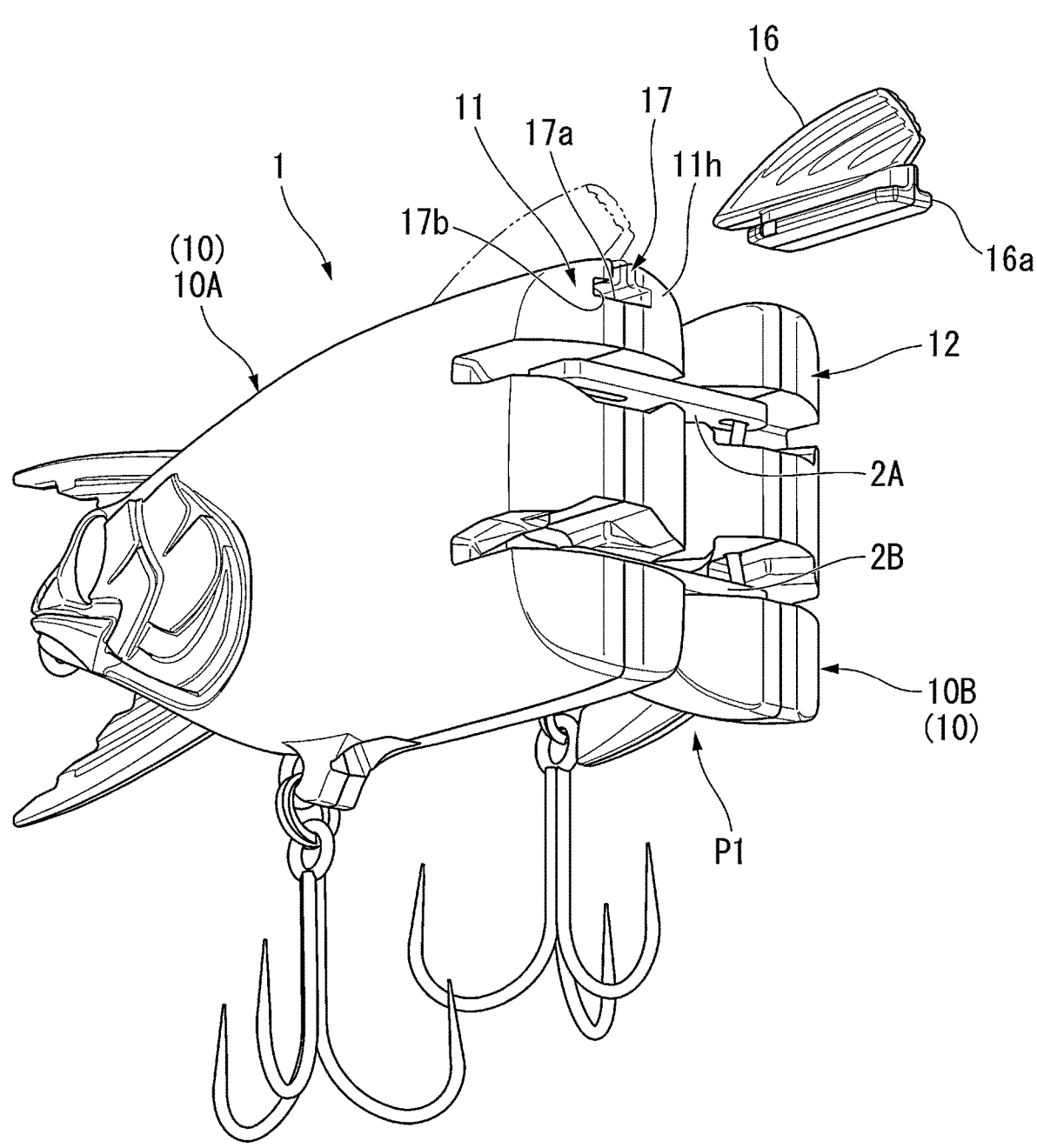
FIG. 10 is an exploded perspective view of an attaching state of a dorsal fin part.

In addition, as shown in FIG. 10, a rear end surface 11*h* of the front connecting part 11 has, at the upper end portion of the rear end surface 11*h*, a mounting portion 17 to/from which a dorsal fin part 16 (functional member) can be attached/detached. The dorsal fin part 16 has a flange portion 16*a* protruding to the left and right. The mounting portion 17 has an insertion opening 17*a* that opens at the rear end surface 11*h*, and an engagement groove 17*b* into which the flange portion 16*a* of the dorsal fin part 16 is inserted from the opening side to achieve an engagement. When the trunk body 10B swings more than 90 degrees with respect to the head body 10A when in the first position P1, the insertion opening 17*a* of the mounting portion 17 exposes the dorsal fin part 16 such that detachment thereof becomes possible.

Next, the operation of the lure 1 configured in this manner will be described in detail based on FIGS. 1-10.

The lure 1 according to the present embodiment comprises: the bodies 10A, 10B divided into a plurality of segments in a front-rear direction X1; the connecting members 2A, 2B that connect the pair of connecting parts 11, 12 that face each other in the front and rear direction of the bodies 10A, 10B; the holding part 40 provided in the front connecting part 11 of the pair of connecting parts 11, 12; the first swinging shaft 3A that is provided in the front connecting part 11, that swingably supports the connecting members 2A, 2B, and that guides the connecting members 2A, 2B between the first position P12 and the second position P2 where the connecting members 2A, 2B are held by the holding part 40; and the second swinging shaft 3B that is provided in the other rear connecting part 12, and that swingably supports the connecting members 2A, 2B. The front and rear bodies 10A, 10B move in directions away from each other when the connecting members 2A, 2B in the front connecting part 11 are in the first position P1.

In the present embodiment, when the lure 1 is caused to swim, the front and rear bodies 10A, 10B come close together and the connecting members 2A, 2B are maintained in the second position P2 where the connecting members 2A, 2B are held by the holding member 40 provided in the front connecting part 11, so that the swinging of the bodies 10A, 10B relative to each other is restricted, resulting in a swing with a small swingable angle θ. Therefore, the swingable angle θ of the trunk body 10B on the rear side relative to the head body 10A on the front side is restricted to a range that allows swimming action in the swimming attitude, such as ±90 degrees or less. On the other hand, during flight of the lure 1, the front and rear bodies 10A, 10B move away from each other due to centrifugal force generated by the flight, so that the connecting members 2A, 2B move away from the holding part 40 and move from the second position P2 to the first position P1 on the first swinging shaft 3A. That is, as a result of the front and rear bodies 10A, 10B moving away from each other, the region in which the bodies 10A, 10B interfere with each other becomes small, thereby increasing the swingable angle θ. Therefore, during flight of the lure 1, the swingable angle θ can be set greater than ±90 degrees, for example, resulting in a flight attitude in which the tail side of the trunk body 10B on the rear side faces forward. Accordingly, the flight attitude of the lure 1 during flight becomes stable and the flight distance can be increased.

In addition, in the present embodiment, when the swingable angle θ is 0 degrees when the front and rear bodies 10A, 10B are positioned on a straight line in the front-rear direction X1, the swingable angle θ of the trunk body 10B on the rear side relative to the head body 10A on the front side is ±90 degrees or less when in the second position P2, and the swingable angle θ exceeds ±90 degrees when in the first position P1. With this configuration, the swingable angle of the trunk body 10B relative to the head body 10A becomes ±90 degree or less, so that the desired swimming action can be achieved. In addition, the swingable angle θ in the flight attitude exceeds ±90 degrees, so that the flight attitude of the lure 1 during flight can be more reliably stabilized and the flight distance can be increased.

In addition, in the present embodiment, the front and rear bodies 10A, 10B comprise the restricting walls 11g, 12g that restrict the swingable angle θ between the bodies 10A, 10B to ±90 degrees or less when in the second position P2. With this configuration, the swingable angle θ of the connecting members 2A, 2B can be restricted to ±90 degrees or less by the restricting walls 11g, 12g when in the second position P2.

Furthermore, in the present embodiment, the first swinging shaft 3A comprises the swinging shaft portions 33 that support the connecting members 2A, 2B when in the first position P1, and the guide portions 34 that guide the connecting members 2A, 2B from the swinging shaft portions 33 toward the holding part 40. The guide portions 34 gradually incline forward with proximity to the holding part 40. With this configuration, when centrifugal force is not acting on the lure 1, the connecting members 2A, 2B are held by the holding part 40 and guided by the first swinging shaft 3A to move from the first position P1 to the second position P2. At this time, the connecting members 2A, 2B are guided by the inclined guide portions 34 of the first swinging shaft 3A and move obliquely forward, so the front and rear bodies 10A, 10B move in directions approaching each other. Therefore, when the connecting members 2A, 2B are in the second position P2, swinging of the connecting members 2A, 2B about the first swinging shaft 3A is restricted, and the trunk body 10B on the rear side, which swings about the second swinging shaft 3B, approaches the head body 10A on the front side, limiting the swing range thereof. Therefore, the swingable angle θ does not become large and a suitable swimming attitude can be achieved.

In addition, in the present embodiment, the second swinging shaft gradually inclines rearward as the connecting members 2A, 2B move toward the second position P2. As a result, when centrifugal force is not acting on the lure 1, the connecting members 2A, 2B are held by the holding part 40 and guided by the first swinging shaft 3A and the second swinging shaft 3B to move from the first position P1 to the second position P2. At this time, the connecting members 2A, 2B are guided by the inclined second swinging shaft 3B and move obliquely rearward, so the front and rear bodies 10A, 10B move in directions approaching each other. The connecting members 2A, 2B move to the first position P1 during flight when centrifugal force acts on the lure 1. At this time, the connecting members 2A, 2B are guided by the inclined second swinging shaft 3B and move obliquely forward, so the front and rear bodies 10A, 10B move in directions away from each other. That is, the trunk body 10B on the rear side (second swinging shaft 3B side) can also be moved in a direction in which the front and rear bodies 10A, 10B move away from each other, increasing the distance between the front and rear bodies 10A, 10B, so the swingable angle θ can be efficiently increased.

In addition, in the present embodiment, the holding part 40 is a magnet. The connecting members 2A, 2B are made of a magnetic material. As a result, the connecting members 2A, 2B and the holding part 40 made of a magnet can be easily attached to/detached from each other with a simple structure using magnetic force.

In addition, in the present embodiment, an end surface (rear end surface 11h) of the front connecting part 11 oriented in the front-rear direction has the mounting portion 17 to/from which the dorsal fin part 16 can be attached/detached. As a result, when the connecting members 2A, 2B are in a swingable position, the swingable angle θ between the front and rear bodies 10A, 10B can be maximized to expose the rear end surface 11h of the front connecting part 11, thereby making it possible to attach/detach the dorsal fin part 16 to/from the mounting portion 17 provided on this end surface.

In the lure 1 according to the present embodiment configured as described above, the flight attitude of the lure 1 during flight becomes stable and the flight distance can be increased.

The above-described embodiments of the lure according to the invention are presented as examples and are not intended to limit the scope of the invention. The embodiments may be implemented in a variety of other forms; furthermore, various omissions, substitutions and changes may be made without departing from the essence of the invention. Embodiments and modifications thereof include those that can be easily conceived of by a person skilled in the art, those that are substantially the same, and those that are of equivalent scope.

For example, in the embodiment described above, the swing mechanism is composed of the connecting parts 11, 12 between the head body 10A and the trunk body 10B that are segmented into two parts in the front-rear direction X1, but the number of segments of the lure body in the front-rear direction is not limited to two, and may be three, for example. In the case of a body segmented into three parts, a swing mechanism similar to the connecting parts 11, 12 of the above-mentioned embodiment may be provided in the connecting part of each body.

In addition, in the present embodiment, the holding part 40 is provided in the front connecting part 11 of the head body 10A on the front side; however, the holding part 40 may be provided in only the rear connecting part 12 of the trunk body 10B on the rear side, or be provided in both the front connecting part 11 and the rear connecting part 12.

Additionally, in the present embodiment, the restricting walls 11g, 12g are provided in the respective recesses 11a, 12a of the head body 10A and the trunk body 10B, but no limitation is imposed thereby. That is, it is sufficient if either the first restricting walls 11g or the second restricting walls 12g are provided. In addition, the mechanism for restricting the swingable angle between the bodies 10A, 10B when in the second position to ±90 degrees or less is not limited to the restricting walls 11g, 12g described above, and a restricting portion having a another configuration may be used. Alternatively, the restricting portion itself may be omitted.

Furthermore, in the present embodiment, the first swinging shaft 3A comprises the swinging shaft portions 33 that support the connecting members 2A, 2B when in the first position P1, and the guide portions 34 that guide the connecting members 2A, 2B from the swinging shaft portions 22 toward the holding part 40, and the guide portions 34 gradually incline forward with proximity to the holding part 40, but the invention is not limited to such a configuration. Similarly, in the present embodiment, the second swinging shaft 3B gradually inclines rearward as the connecting members 2A, 2B move toward the second position P2, but no limitation is imposed thereby.

Additionally, in the present embodiment, a configuration in which the holding part 40 is a magnet is illustrated as an example, but the holding part 40 is not limited to being a magnet. For example, it is sufficient if the configuration uses an elastic member, a biasing member (spring member), or the like, to hold the connecting members 2A, 2B at the second position P2, and the connecting members 2A, 2B are moved to the first position P1 when the front and rear bodies move away from each other.

What is claimed is:

1. A lure, comprising:
a front body;
a rear body divided from the front body to form a plurality of segments in a front-rear direction;
a connecting member connecting first and second connecting parts that face each other in the front and rear direction of the front and rear bodies;
a holding part provided in at least one of the first and second connecting parts,
a first swinging shaft provided in the at least one of the first and second connecting parts, swingably supporting the connecting member, and configured to guide the connecting member between a first position and a second position where the connecting member is held by the holding part; and
a second swinging shaft provided in the other of the first and second connecting parts and swingably supporting the connecting member,
when the connecting member in the one of the first and second connecting parts is in the first position, the front and rear bodies move in directions away from each other, and
the first swinging shaft has a swinging shaft portion supporting the connecting member at the first position, and
a guide portion configured to guide the connecting member from the swinging shaft portion in a direction approaching the holding part, and
the guide portion gradually inclines forward with proximity to the holding part.

2. The lure according to claim 1, wherein
when a swingable angle in an attitude in which the front and rear bodies are positioned on a straight line in the front-rear direction is 0 degrees,
the swingable angle of rear body on the rear side relative to the front body on the front side becomes ±90 degrees or less when in the second position, and
the swingable angle exceeds ±90 degrees when in the first position.

3. The lure according to claim 2, wherein
at least one of the front and rear bodies includes a restricting portion configured to restrict the swingable angle between the bodies when in the second position to ±90 degrees or less.

4. A lure, comprising:
a front body;
a rear body divided from the front body to form a plurality of segments in a front-rear direction;
a connecting member connecting first and second connecting parts that face each other in the front and rear direction of the front and rear bodies;
a holding part provided in at least one of the first and second connecting parts,
a first swinging shaft provided in the at least one of the first and second connecting parts, swingably supporting the connecting member, and configured to guide the connecting member between a first position and a second position where the connecting member is held by the holding part; and
a second swinging shaft provided in the other of the first and second connecting parts and swingably supporting the connecting member,
when the connecting member in the one of the first and second connecting parts is in the first position, the front and rear bodies move in directions away from each other,
the second swinging shaft gradually inclines rearward as the connecting member moves toward the second position.

5. The lure according to claim 1, wherein
the holding part is a magnet, and
the connecting member is made of a magnetic material.

6. The lure according to claim 1, wherein
an end surface of at least one of the pair of connecting parts facing the front-rear direction includes a mounting portion to/from which a functional member is capable of being attached/detached.

* * * * *